Nov. 15, 1960  O. E. E. STROMBERG  2,960,194
TRAILER SURGE BRAKE ASSEMBLY
Filed March 14, 1957  3 Sheets-Sheet 1
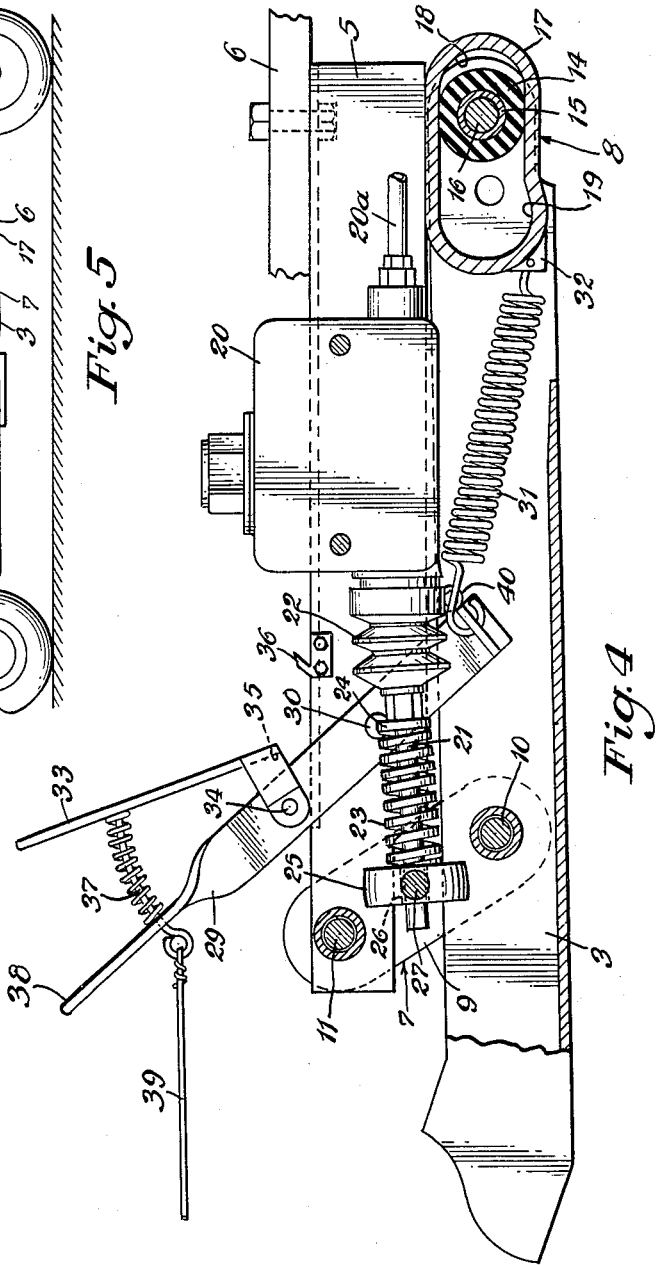
Inventor
Olof E. E. Stromberg
by Parker & Carter
Attorneys Nov. 15, 1960  O. E. E. STROMBERG  2,960,194
TRAILER SURGE BRAKE ASSEMBLY
Filed March 14, 1957  3 Sheets-Sheet 2
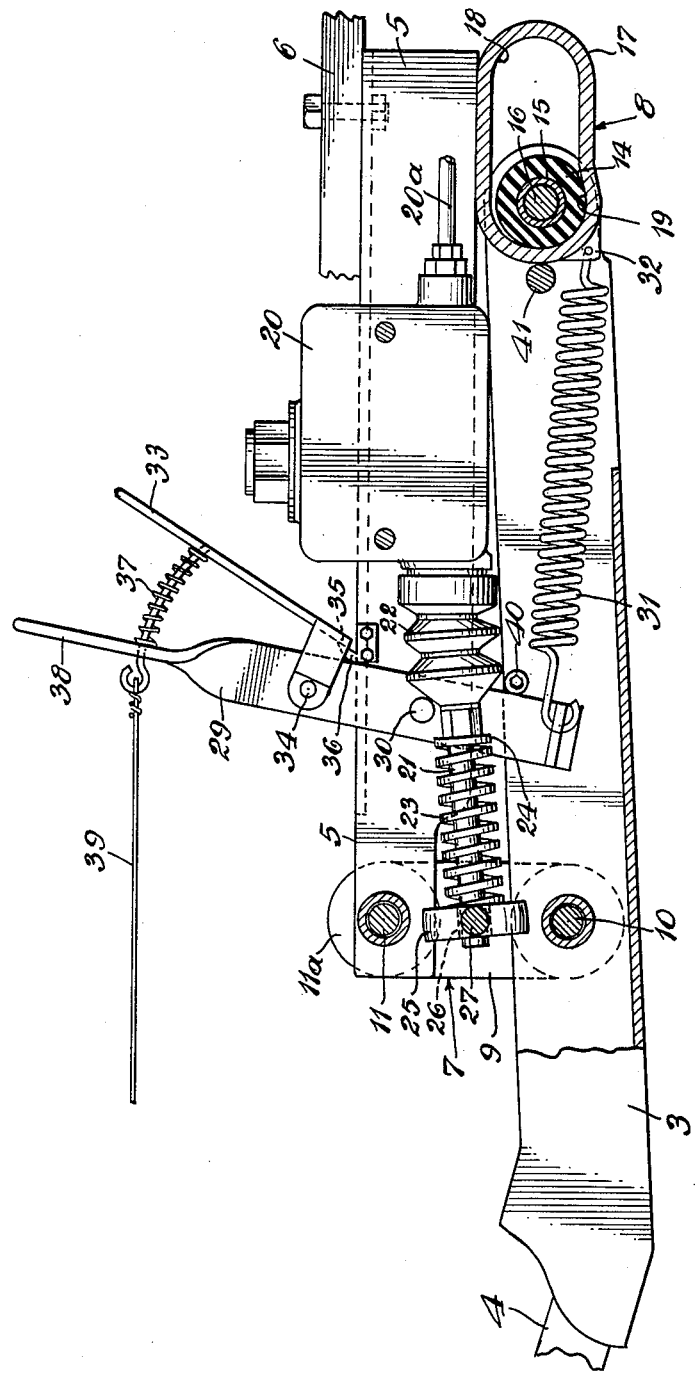
Inventor
Olof E.E. Stromberg
by Parker & Carter
Attorneys Nov. 15, 1960 O. E. E. STROMBERG 2,960,194
TRAILER SURGE BRAKE ASSEMBLY
Filed March 14, 1957 3 Sheets-Sheet 3

Inventor
Olof E. E. Stromberg
by Parker & Carter
Attorneys

United States Patent Office 2,960,194
Patented Nov. 15, 1960

2,960,194

TRAILER SURGE BRAKE ASSEMBLY

Olof E. E. Stromberg, 5453 Northwest Highway, Chicago, Ill.

Filed Mar. 14, 1957, Ser. No. 646,132

17 Claims. (Cl. 188—112)

The present invention is directed to a new and improved surge brake and hitch assembly for trailer vehicles.

One purpose of the present invention is the provision of a surge brake and trailer hitch assembly which allows normal coasting of the tractor-trailer vehicle without actuating the trailer brakes.

Another purpose of the present invention is the provision of a novel hitch assembly for tractor-trailer vehicles and which uses an overrunning tendency of the trailer to actuate the trailer brakes and yet at the same time enables reverse movement of the tractor-trailer vehicle without deactivating or latching out the trailer brake actuating mechanism.

Another purpose of the present invention is the provision of a trailer brake actuating mechanism which utilizes the downward thrust of the trailer and the hitch weight when the trailer brakes are applied to increase the braking action of the trailer brakes.

Another purpose of the present invention is the provision of a new and improved automatically actuated control for a trailer hitch brake actuating mechanism.

Another purpose of the present invention is the provision of improved mechanism for applying a "parking" brake to the trailer of a tractor-trailer vehicle and which automatically releases the "parking" brake upon the occurrence of normal movement of the tractor.

Another purpose of the present invention is the provision of a combined parking brake actuating mechanism for trailer vehicles and emergency brake applying mechanism for the trailer vehicle and which automatically energizes the trailer brake system in the event the trailer separates from the towing vehicle.

Other purposes will appear from time to time in the course of the ensuing specification and claims.

Referring generally now to the drawings:

Figure 1 is a side elevation view of the improved brake actuating mechanism and hitch mechanism constituting the present invention;

Figure 4 is a side elevation similar to Figures 1 and 3 but illustrating a still further operative position of the elements illustrated in Figure 1; and Figure 5 is a diagrammatic view illustrating the use of the invention.

Like elements are designated by like characters throughout the specification and drawings.

Referring specifically now to the drawings, and in the first instance to Figure 5, 1 diagrammatically represents a tractor vehicle for towing a trailer vehicle diagrammatically represented at 2. The lower tow bar 3 is adapted for attachment to the tractor vehicle for example by the ball and socket joint 4. The upper tow bar 5 overlies the lower bar 3 and is adapted for connection to the trailer vehicle at 6.

Figure 2:
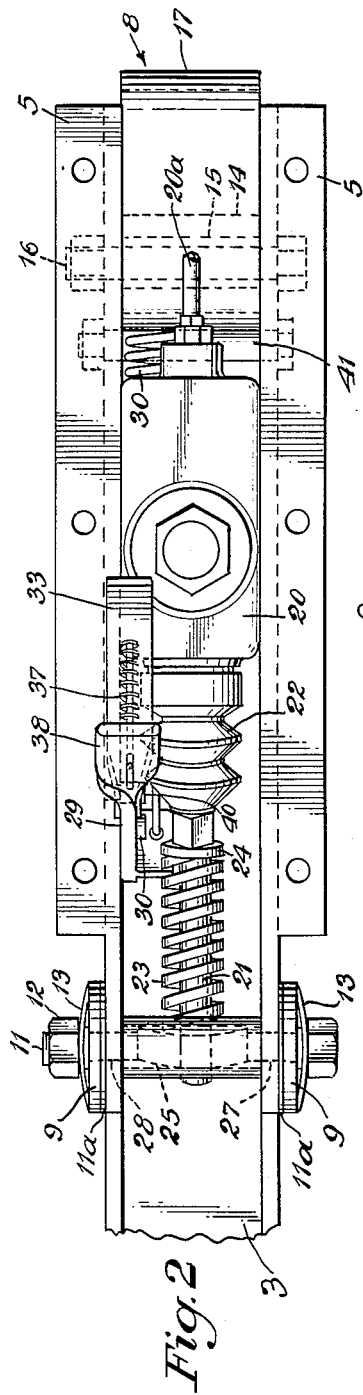
Figure 2 is a plan view of the structure illustrated in Figure 1.

As is illustrated in Figure 2, each of the tow bars 3 and 5 may be formed of spaced, generally parallel joined members.

The two bars are connected for relative movement in the directions of their lengths by link 7 and a roller and slot connection 8. The linkage 7 comprises a pair of shackles 9 pivoted on bolts 10 and 11 in members 3 and 5. The shackles 9 may embrace the sides of the forward end of the member 5.

Friction washers 11A on bolts 10 and 11 are interposed between members 3 and 5 and the shackles 9, to retard movement of the shackles 9. The resistance to such movement may be adjusted by adjusting the nut 12 on the bolt 11. A similar nut (not shown) is provided for the bolt 10.

A spring washer 13 is interposed between the nut for each bolt and the shackle. Thus, by adjusting the nuts on the bolts 10 and 11 the amount of pressure exerted by the shackles on the friction washers and on the upper and lower members can be regulated. The retardation of movement is advantageous from the standpoint of slowing down relative movement between the two main members, resulting in a smoother operation of the two main members.

The rearward end of the member 3 carries a roller 14 which may be made of rubber or similar elastomeric material. The roller 14 is vulcanized onto a bronze bushing 15 that is carried by a shaft bolt 16. The bolt 16 is held in the position illustrated in Figure 1 by the main member 3.

An oblong housing 17 is fixed to the upper main member 5 and serves to house the roller 14. Housing 17 includes an elongated slot portion 18 which extends generally in the direction of the length of the member 5.

The forward portion of the slot 18 includes a depression 19 for the roller 14 to rest in when the two main members are in the relative position illustrated in Figure 1.

The positions of the axis of the roller 14 and housing 17 are such that when the roller 14 abuts against the forward portion of the slot 18, the shackles 9 are upwardly and rearwardly inclined with respect to the longitudinal axis of the main member 3.

A master cylinder 20 is fixed to the upper member 5 behind the shackles 9. The master cylinder may be of any conventional and well known construction. It may include a push rod 21 which during movement toward the cylinder 20 delivers hydraulic fluid to the brakes of the trailer vehicle. A dust guard 22 surrounds the push rod to exclude dust and foreign matter from the cylinder 20. The cylinder 20 may be a pilot cylinder for actuating a slave cylinder or the equivalent thereof whereby the cylinder carried by the hitch assembly merely initiates the delivery of hydraulic pressure of the trailer braking system. The trailer braking systems are well known and may take the form of hydraulically actuated brakes which are responsive to hydraulic pressure developed by the tractor vehicle or can take the form of hydraulically actuated brakes that are energized in direct response to the movement of the push rod 21 of a master cylinder, such as is shown at 20 in Figure 1. The master cylinder, in such a case, may have an outlet conduit 20A leading to the brke actuating cylinders of the trailer.

The trailer brakes (not shown) are preferably of the Uno-servo type wherein a greater braking effort is applied when the vehicle moves in the forward direction than the effort applied when the vehicle moves in reverse.

The push rod 21 is interconnected with the shackles 9 in such a way that movement of the upper member 5 in a forward direction with respect to the lower member 3 serves to force the push rod toward the brake cylinder 20. The connection is such as to allow a predetermined amount of such relative motion without applying any braking effort. The connection also allows the lower member 3 to move rearwardly with respect to the upper member 5 without exerting any effort on the push rod 21.

This connection takes the form of a compressible spring 23 which surrounds the push rod 21 and is positioned between an abutment 24 and an abutment 25. The abutment 24 is carried by the push rod between the ends of the push rods. The abutment 25 is pivotally mounted in the shackles 9. The abutment 25 includes a central aperture 26 through which the push rod 21 extends. The pivot pins for the abutment 25 are shown at 27 and 28.

The hitch assembly includes a safety brake applying mechanism for the trailer which is combined with a parking brake. As illustrated in Figure 1, a lever 29 is pivotally mounted on the upper member 5 as at 30. The lever 29 is biased in a counterclockwise direction (as viewed in Figure 1) by a tension spring 31. The tension spring 31 is connected between the lower end of the lever 29 and an ear 32 formed on the housing 17. A latch lever 33 is pivoted to the lever 29 as at 34. The latch lever 33 includes a surface 35 adapted to contact and abut against a striker 36 carried by the main member 5. The latch thus formed prevents counterclockwise movement of the lever 29 as developed by the spring 31. The latch lever 33 includes a rod 37 which extends through an aperture in the handle 38 of the lever 29. A cable or cord 39 is attached to the end of the rod 37 and must be fixed to the tractor vehicle.

An abutment 40 is carried by the lower main member 3 and is positioned adjacent the lower end of the lever 29 when the lever 29 is in the latched position illustrated in Figure 1. When the latch lever 33 is released, the tension in the spring 31 pulls the lower end of the lever 29 rearwardly. The lever 29 in the course of such movement strikes the abutment 40 thus exerting a forwardly directed force on the main member 5 through the pivot 30 and a rearward force on the main member 3. The tension developed in the spring 31 is sufficient to produce relative movement between the two main members 3 and 5 so as to force the push rod 21 inwardly within the cylinder 20 and thus energize the trailer brakes.

In case it is desired to lock out the trailer brakes for any reason, a pin 41 may be inserted between the two side portions of the main member 3 in a position abutting against the housing 17 when the roller 14 is in the forward position.

During use of the hitch assembly herein shown, the tractor vehicle 1 exerts a pulling force through the lower member 3. The lower main member 3 in turn transmits this towing force through the roller 14, the forward abutment portion of the slot 18, the upper main member 5 and to the trailer vehicle 2.

When the trailer starts to "overrun" the tractor vehicle, the trailer vehicle will be tending to push the tractor. This results in movement of the upper main member 5 with relation to the main member 3. The housing 17 moves forwardly with relation to the roller 14, thus moving the shackles 9 in a counterclockwise direction with respect to the pivot bolt 10 as appears in Figure 1.

During the initial phases of such movement the spring 23 is being compressed without actually transmitting any appreciable movement to the push rod 21. As the forward movement of the main member 5 continues, however, the spring 23 serves to force the push rod 21 inwardly within the cylinder 20, thus delivering braking fluid under pressure to the brake actuating cylinders of the trailer vehicle. When the application of brakes to the trailer vehicle has been sufficient to overcome the "overrunning" of the trailer vehicle, the tractor will pull the main member 3 forwardly with respect to the main member 5 until the roller 14 again abuts against the forward end of the slot 18. Normal towing conditions then prevail until another overrunning condition is encountered.

Figure 3:
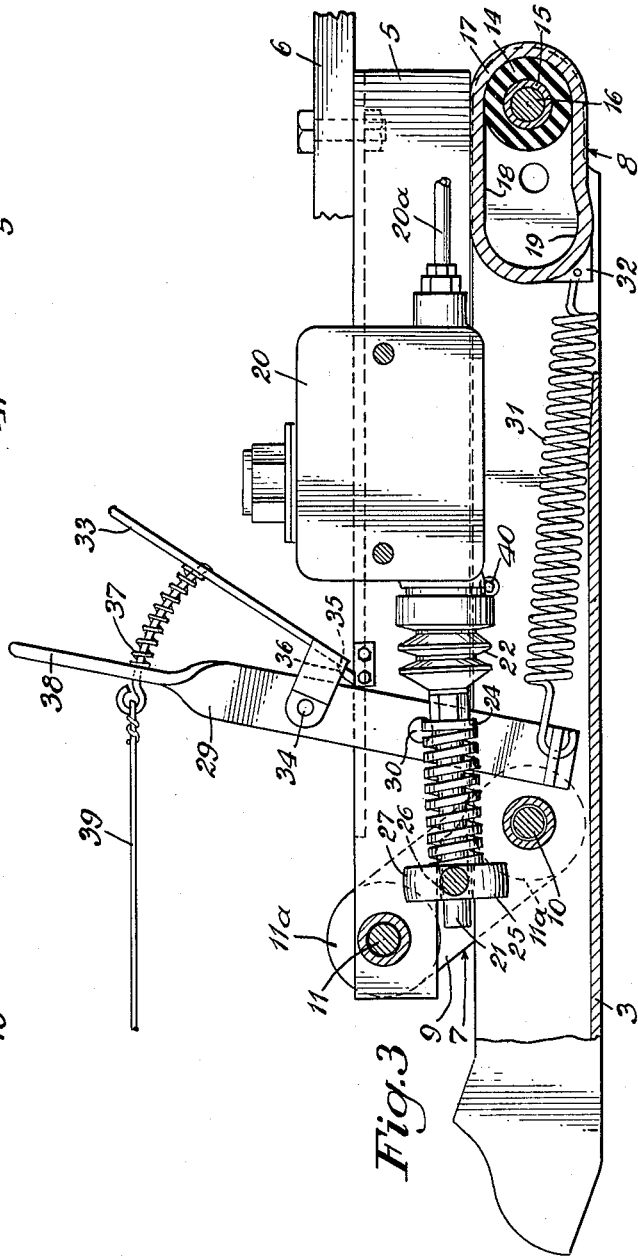
Figure 3 is a side elevation similar to Figure 1 but showing another operative position of the elements illustrated in Figure 1.

The system is such that small surges of forward motion of the trailer vehicle with respect to the tractor vehicle do not actually result in the application of the brakes of the system. Such small surges may be encountered when the two vehicles are proceeding over rough terrain. In case of relatively small amounts of surging force of the trailer, the resistance to movement of the two main members 3 and 5, which is offered by the friction of the washers 10, may be enough to prevent any actual relative motion between the two main members 3 and 5. Larger amounts of surging action by the trailer vehicle result in unseating the roller 14 from the depression 19 and motion of the shackles 9 in a counterclockwise direction with respect to the pivot bolt 10. During the initial phases of such relative motion of the two main members, the spring 23 offers a resistance to such motion. Furthermore, the rearward disposition of the shackle 9 with respect to the main member 3 offers an additional resistance to such motion. As the motion continues, the shackles 9 are moved over center and the spring 23 is compressed still further. During this movement, the spring 23 gradually starts forcing the push rod 21 within the cylinder 20, thus initiating the application of the brakes to the trailer vehicle. If the overrunning tendency continues during the initial application of the brakes, the main member 5 will continue movement until it reaches a position illustrated generally in Figure 3. As it progresses to this position, and as the brakes of the trailer vehicle are applied, the trailer vehicle, due to the application of the brakes, will be exerting a downward thrust on the main member 5, thus producing an additional force tending to move the shackles 9 in a counterclockwise direction. This results in an increased braking effort. This insures a maximum brake applying force.

The tension in spring 23 may be varied in accordance with varying loads represented by the trailer. The tension should be such that full braking effort is not applied until the trailer imposes a downward thrust on the shackles 9 in response to the smaller initial braking effort. In other words, the spring will absorb the thrust of the movement of the two main members without transmitting appreciable thrust to the rod 21, until the shackles move over center and approach the position illustrated in Figure 3. Thus when the tractor-trailer vehicle is reversed, very little braking effort will be applied because during reverse motion the trailer exerts no downward thrust on the hitch. This is particularly true if Uno-servo brakes are employed on the trailer. Servo brakes are brakes wherein the power exerted by the operator through the brake pedal is augmented as a result of vehicle movement because the friction between the brake shoe and the drum tends to increase the pressure applied by the brake to the drum.

Uno-servo brakes are those wherein this servo effect results only from forward vehicle movement but does not make itself effective upon reverse movement. In a sense, the servo brake is a half of the conventional Bendix duo-servo brake because the servo effect is only felt with the vehicle moving forward.

When it is desired to move the tractor and trailer in the reverse direction, the lower member 3 exerts a pushing force through the upper member 5 to the trailer vehicle. The roller 14 moves rearwardly within the slot 18 until it abuts against the rearward end of the slot 18.

When it is desired to apply the trailer brakes when the tractor and trailer (or the trailer alone) are parked, the latch lever 33 is released and the main members 3 and 5 may then undergo relative motion in the brake applying direction.

During normal operation of the tractor and trailer, the lever 38 and latch lever 33 are kept in the latched position illustrated in Figure 1. The safety cord or chain 39 which is attached to both the tractor vehicle and trailer vehicle, will then release the latch lever 33 in the event the tractor vehicle separates from the hitch assembly. Separation of the tractor exerts a pulling force on the rod 37, thus releasing the latch lever 33 and allowing the spring 31 to produce relative movement between the two main members 3 and 5. The unlatched position, which occurs during parking of the vehicle or during the emergency application of the braking system, is illustrated in Figure 5.

To release the trailer brakes from the "parked" condition, a towing force may be applied to the main member 3. This forces the abutment 40 against the lever 38, and rotates the lever into a position where the latch automatically engages.

If it is desired to release the trailer brake manually, the lever 38 is rotated by hand from the position shown in Figure 4 where the brakes are applied to the position shown in Figure 1 to release the brake. The brake thus may be released from parking position either by hand or automatically when towing force is applied. There can be no danger of the tractor trying to carry the load while the brake on the trailer is applied.

Whereas I have shown and described an operative form of my invention I wish it to be understood that this showing and description of the invention is to be taken in an illustrative or diagrammatic sense only. There are many modifications to the invention which will fall within the scope and spirit thereof and which will be apparent to those skilled in the art. The scope of the invention should be limited only by the scope of the hereinafter appended claims.

I have illustrated my brake actuating member mechanism as applying pressure to hydraulic brakes. It is well known that mechanically actuated brakes are under many circumstances interchangeable with hydraulic brakes and the same type of mechanism disclosed in my present application as causing the actuation of hydraulic brakes can equally well be used to apply cable actuated or rod actuated or any other type of mechanically rather than hydraulically actuated brakes.

I claim:

1. In an overrunning brake actuating and hitch assembly for tractor trailer vehicles, a pair of interconnected relatively movable hitch members, one adapted for attachment to a tractor and the other adapted for attachment to a trailer, a link pivotally connected to each of the two members, a lost motion connection between said two members at a single point spaced from said link including a cross head on one member, a cross head guide on the other between the link and the trailer, the link and lost motion connection constraining the members to relative angular movement upon relative longitudinal movement thereof, means limiting relative movement of said members, and trailer brake actuating means rigidly connected to a first one of the relatively movable hitch members and operatively connected to the second one and responsive to relative movement of said members to thereby actuate the trailer brakes during relative movement of said members.

2. In an overrunning brake actuating and hitch assembly for tractor trailer vehicles, a pair of interconnected relatively movable hitch members, one adapted for attachment to a tractor and the other adapted for attachment to a trailer, a roller carried by one of said members and received within an elongated opening carried by the other of said members, said roller being effective to abut against one end of said opening when a towing force is imparted to the tractor attachable member to thereby transmit a towing force to the other of said members, a link pivotally connected between said two members, said link being rearwardly inclined with respect to the longitudinal axis of the tractor attachable member when said roller abuts against said end of said opening, and trailer brake actuating means interconnected with said link and connected to one of the relatively movable hitch members and adapted to actuate the trailer brakes upon movement of said members relative to one another.

3. In an overrunning brake actuating and hitch assembly for tractor trailer vehicles, a pair of interconnected relatively movable members, one adapted for attachment to a tractor and the other adapted for attachment to a trailer, a link interconnected between the forward portion of one member and the other member, means defining a lost motion connection between the rearward portions of said members, said lost motion connection including a roller carried by one member and received within a slot carried by said other member, said roller being adapted to press against one end of said slot when a towing pressure is applied to one of said members, said slot having a depression adjacent said end for reception of said roller, and brake cylinder operating means connected with and between said members for actuation thereby during relative movement of the same.

4. In a tractor trailer hitch brake actuating assembly, an upper member adapted for attachment to a trailer and a lower member adapted for attachment to a tractor, a linkage connection between the upper and lower members, a brake mechanism adapted for actuation upon relative motion between said upper member, lower member, and linkage, said upper member having a slotted housing, said lower member having a roller received within said slotted housing, the slot in said housing having a forward surface adapted for abutting engagement with said roller when a towing force is applied to said lower member, the slot in said housing having a depression adjacent the forward end of said slot for reception of said roller.

5. In a tractor trailer hitch brake actuating mechanism, a first towing member adapted for connection to a towing vehicle, a second towing member adapted for connection to a trailer vehicle, a linkage connection between the forward end of said second member and an intermediate portion of the first member, means defining a lost motion connection between the rearward end of said first member and a rearward portion of said second member, a master brake actuating cylinder carried by said second member, said cylinder having a plunger, and a compressible connection between said plunger and said linkage, said compressible connection being effective to actuate said plunger upon the occurrence of a predetermined relative motion between said two members.

6. The structure of claim 5, wherein said compressible connection includes a spring interposed between an abutment on said plunger and an abutment on said linkage, the abutment of said linkage having an aperture through which the plunger passes.

7. In a tractor trailer hitch brake actuating mechanism, a first towing member adapted for connection to a towing vehicle, a second towing member adapted for connection to a trailer vehicle, a linkage connection between the forward end of said second member and an intermediate portion of the first member, means defining a lost motion connection between the rearward end of said first member and a rearward portion of said second member, a master brake actuating cylinder carried by said second member, said cylinder having a plunger, and a spring interposed between an abutment on said plunger and said linkage, said spring being compressible in response to a predetermined relative motion between said two members without transmission of appreciable movement to said plunger and being effective upon the occurrence of larger amounts of relative movement of said two members to cause movement of said plunger to actuate the trailer brakes.

8. In a tractor trailer hitch brake actuating mechanism, a first towing member adapted for connection to a towing vehicle, a second towing member adapted for connection to a trailer vehicle, a link pivotally connected between the forward end of said second member and an intermediate portion of said first member, means defining a lost motion connection between the rearward end of said first member and a rearward portion of said second member, a master brake actuating cylinder carried by said second member, means limiting relative movement of said two members, said link being upwardly and rearwardly inclined when said two members are at one limit of motion in response to a normal towing force, an actuating member for said cylinder, and a compressible connection between said actuating member and said link, said compressible connection being effective to move said actuating member and cause application of the trailer brakes upon the occurrence of a predetermined relative motion between said two members.

9. In an overrunning surge brake actuating and hitch assembly for tractor trailer vehicles, a pair of relatively movable hitch members, one of said members being a tractor carried member and the other being a trailer carried member, means for transmitting a towing pressure from said tractor carried member to the trailer carried member, brake actuating means responsive to movement of said members with relation to one another and in the absence of the exertion of a towing pressure between said two members, a lever movably mounted on one of said members and adapted for engagement with an abutment carried by the other of said members whereby movement of said lever causes relative movement of said members, resilient means for biasing said lever into engagement with said abutment to thereby cause relative movement of said two members, and latch means for holding said lever out of pressure contact with said abutment.

10. The structure of claim 9, wherein said latch means is automatically operable upon the transmission of a towing pressure between said two members.

11. The structure of claim 9, wherein said lever is carried by the trailer carried vehicle and said resilient means includes a spring connected to said lever and said trailer carried member.

12. The structure of claim 9, wherein said latch means includes a latch lever carried by said first named lever and adapted for engagement with a striker carried by the trailer carried member, and means adapted for connection between said latch lever and the tractor vehicle whereby separation of the tractor from the hitch assembly and breakage of said connection releases said latch lever to thereby cause relative movement of said hitch members and resultant application of the trailer brakes.

13. In a tractor trailer hitch brake actuating assembly, a first towing member adapted for connection to a towing vehicle and a second towing member adapted for connection to a trailer vehicle, means interconnecting said two members for relative motion in the direction of their lengths, a trailer brake applying mechanism interconnected with said members and adapted for actuation upon relative movement of said members, a lever movably mounted on one of said members, resilient means biasing said lever in one direction of movement, an abutment carried by the other member and adapted for contact with said lever upon movement thereof in said one direction, and latching means for holding said lever in a predetermined position whereby said resilient means is effective to cause rotation of said lever, contact between said abutment and lever being effective to cause relative motion of said members upon release of said latching means.

14. The structure of claim 13, wherein said latch means is positioned for engagement with said lever upon movement of said lever in response to contact between said abutment and said lever during forward movement of said first towing member with respect to said second towing member.

15. The structure of claim 13, wherein said resilient means biases one end of said lever toward the trailer vehicle and said latch means is positioned for engagement with said lever upon the occurrence of a predetermined relative motion in the opposite direction.

16. In an overrunning brake actuating and hitch assembly for tractor trailer vehicles, a pair of interconnected relatively movable hitch members, one adapted for attachment to a tractor and the other adapted for attachment to a trailer, a link pivotally connected to each of the two members, a lost motion connection between said two members at a single point spaced from said link including a cross head on one member, a cross head guide on the other between the link and the trailer, the link and lost motion connection constraining the members to relative angular movement upon relative longitudinal movement thereof, means limiting relative movement of said members, and resilient means interposed between the brake actuating means and said link to thereby absorb shocks to said members without actuation of the trailer brakes while transmitting an actuating force to said trailer brakes upon the occurrence of a predetermined relative movement of said members.

17. A hitching assembly for coupling a tractor vehicle to a trailer vehicle including a first hitch member carried by the tractor vehicle and a second hitch member carried by the trailer vehicle, a roller mounted on the tractor carried member and movable within an elongated housing mounted on the trailer carried member so that application of a towing force imparted to said tractor carried member will be effectively transmitted to said trailer vehicle through abutment of said roller against one end of said housing, a link pivotally connecting the hitch members and a trailer brake actuating means carried by one of said members, a connection between the link intermediate its ends and the brake actuating means operable in response to the annular movement of the link resulting from disengagement of the roller from its position of abutting engagement with the housing to operate trailer brakes upon overrunning of the tractor vehicle by the trailer vehicle.

References Cited in the file of this patent

UNITED STATES PATENTS

| 1,896,427 | Sylvester | Feb. 7, 1933 |
| 1,966,129 | Michael | July 10, 1934 |
| 2,320,585 | Gill | June 1, 1943 |
| 2,662,616 | De Lateur | Dec. 15, 1953 |
| 2,737,265 | Cushman | Mar. 6, 1956 |
| 2,779,443 | Tucker | Jan. 29, 1957 |

FOREIGN PATENTS

| 754,919 | Germany | July 21, 1952 |